July 13, 1926.

H. MOAKLEY ET AL

PRODUCTION METER

Filed Feb. 5, 1921

INVENTORS
Henry Moakley and
Ellis H. P. Rohr,
BY
Moakley and Gill
ATTORNEYS.

July 13, 1926.

H. MOAKLEY ET AL

PRODUCTION METER

Filed Feb. 5, 1921

H. MOAKLEY ET AL

PRODUCTION METER

Filed Feb. 5, 1921

Patented July 13, 1926.

1,591,989

UNITED STATES PATENT OFFICE.

HENRY MOAKLEY, OF NEW YORK, N. Y., AND ELLIOTT P. ROSS, OF EAST ORANGE, NEW JERSEY, ASSIGNORS TO FORD INSTRUMENT COMPANY, INC., A CORPORATION OF NEW YORK.

PRODUCTION METER.

Application filed February 5, 1921. Serial No. 442,801.

This invention relates to meters and more particularly to the type of meter which is adapted to measure or indicate the work performed by a machine such as textile machines, screw machines or other types of automatic machines, or hand operated machines of various types such as machine tools.

One of the objects of the invention is to provide a meter of this character which if the rate at which the machine should operate and the efficiency of its operation is known, will give a continuous indication as a function of time of the work accomplished by the machine to which it has been attached. Other objects of the invention will be apparent from the description and the invention consists of the constructions and combinations hereinafter described and particularly pointed out in the appended claims.

In the drawings:—

Figure 1:
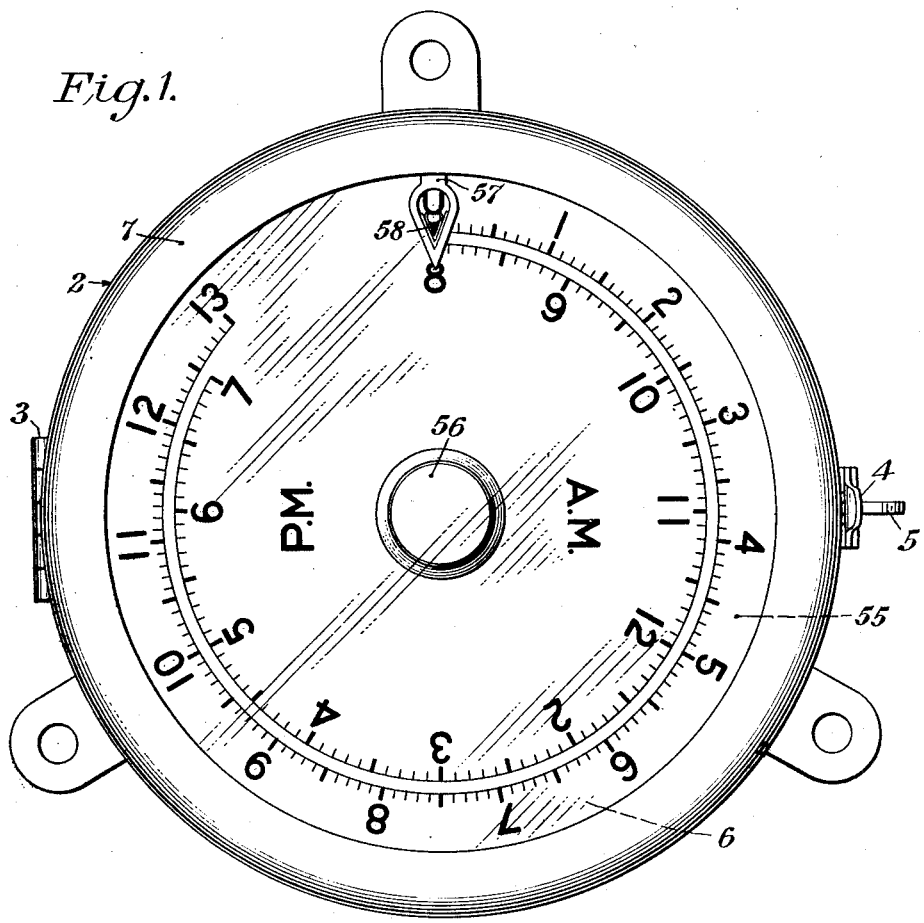
Figure 1 is a front elevation of our improved production meter.
Figure 3:
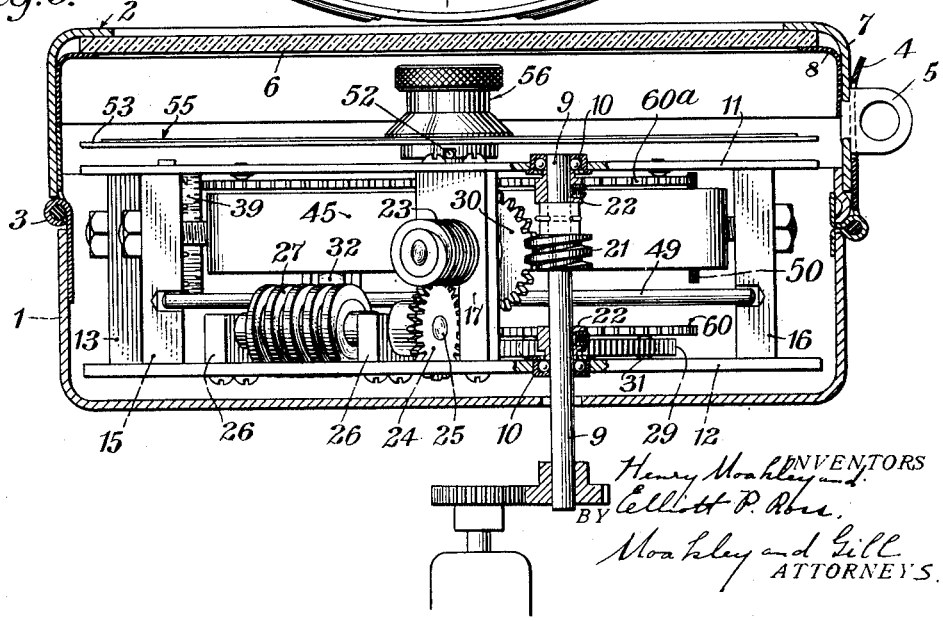
Figure 3 is a view wherein the casing is shown in section and the assembled interior mechanism is viewed in bottom plan, parts being in section for illustrative purposes.

Referring to the drawings, 1 represents a cylindrical box portion of the casing, and 2 a cover having a bezel 7 which is hinged at 3 to the box 1. Attached to box 1 is a hasp 4 adapted to slip over a staple 5 affixed to the cover bezel 7, when the latter is in closed position, as shown in Figs. 1 and 3, whereby the application of a padlock to a staple 5 will prevent improper access to the internal mechanism of the meter by unauthorized persons. The operating parts of the meter being thus protectedly housed, readings disclosing the progress of production by the machine to which the meter is attached, can be made at any time through the glass pane 6, that is held in place in the cover bezel 7 by a retaining ring 8.

Projecting out of box 1 a suitable distance, is a driving shaft 9, to which movement is imparted by the machine the output of which is to be measured by the production meter. Any convenient driving connection may be made between the machine and meter, as, in cases of machines having rotary motion, by a coupling, flexible shaft, chain and sprocket, or the like. For machines having a rectiliner motion, as punch presses, shapers and planers, their reciprocation may be converted into rotary motion by appropriate means.

Within the meter casing, shaft 9 is supported in ball bearings 10, carried in front and rear frame plates 11 and 12, respectively. These frame plates are properly spaced apart for the accommodation of the meter mechanism by posts, of which posts 13 and 14 are associated and 15 and 16 inter-related, while post 17 serves its purpose in its unitary character, all as is presently to be explained; the foregoing posts co-acting with frame plates 11 and 12 to form a frame for the operable elements of the mechanism. The frame so formed is removably supported within the meter casing, by a pair of long posts 18 and 19 and a short post 20. The last mentioned post is shown in section in Fig. 4 and as having frame plate 12 secured thereto by a screw. Posts 18 and 19, which are similar to but longer than post 20, pass through apertures in plate 12 and extend to plate 11, which is secured to them as plate 12 is to post 20. The moving elements of the internal mechanism being combined in supported relation to the removable frame, it is obvious that the mechanism as a whole is readily removable for inspection, repair or replacement by no greater effort than the removal of the screws in posts 18, 19 and 20 and the withdrawal of the mechanism from the casing.

Figure 2:
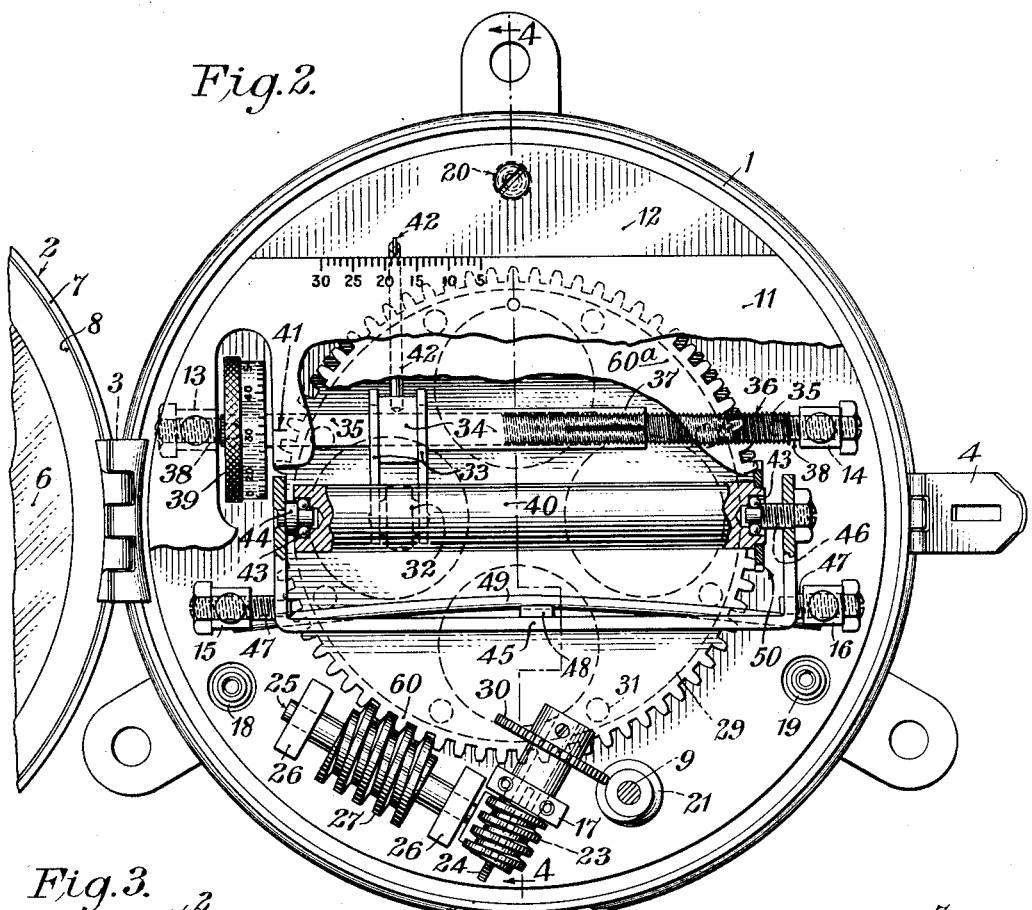
Figure 2 is another front elevation of the same, with the cover thrown open, certain parts being broken away to disclose interior construction.

Reference to Fig. 3 shows that driving shaft 9 is provided with a worm 21 and also with thrust collars 22 adjacent to and co-operating with ball bearings 10, whereby shaft 9 is suited to relatively rapid rotation. The rotation of shaft 9 through its worm 21 rotates gear 30, which may, for example, have thirty teeth, and therefore revolve 1/30 of a revolution to each complete turn of worm 21. The gear reduction may be continued as shown in Figs. 2 and 3, wherein another or intermediate worm 23 meshes with a further gear 24, which will be assumed to have twenty-four teeth. Gear 24 is affixed to a shaft 25 that is mounted in bearing blocks 26, this shaft also carrying another or disk-driving worm 27. Fig. 2 clearly shows worm 27 in mesh with a gear wheel 60, which to harmonize in subsequent explanation with gear ratios already assumed may be regarded as having sixty teeth.

Figure 4:
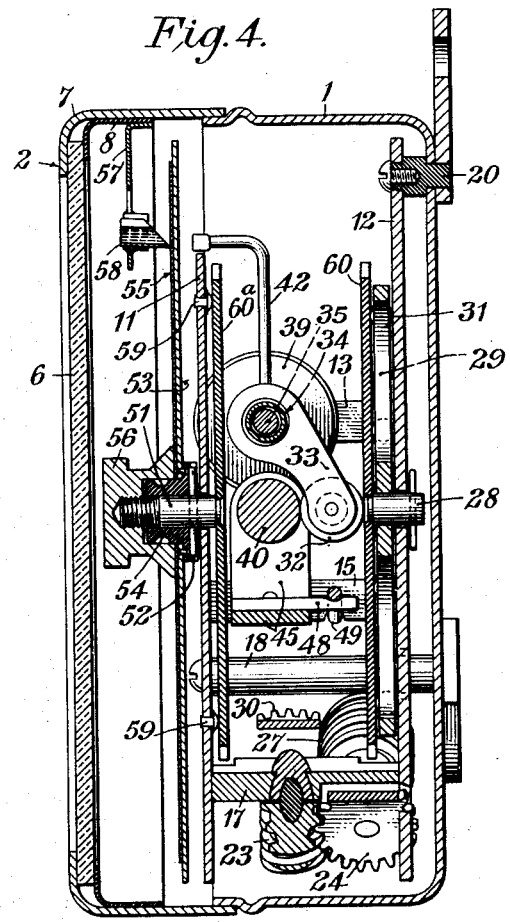
Figure 4 is a vertical section through the production meter, being taken on the line 4—4 of Figure 2.

A central section of gear wheel 60, seen in Fig. 4, shows a short shaft or stud 28 rigidly combined with gear 60, and as projecting through an annular ball-retainer 29 and frame plate 12. Washers are preferably interposed between the gear, ball-retainer, plate and a pin through stud 28, as shown, balls 31 in retainer 29 assisting in the smooth turning of gear 60.

The outwardly facing side of gear 60 is given a smooth finish, such as may be attained by grinding the same. Gear 60, in view of this surface, becomes also a driving disk adapted to rotate a spherical roller 32 that revolves between a pair of carriage arms 33 on a shaft mounted in those arms. Extending away from roller 32, arms 33 encircle an enlarged end portion of a sleeve 34, which with such arms forms a carriage for spherical roller 32.

Through the tubular carriage sleeve 34 extends a shaft 35 having an unthreaded portion and a threaded portion 36, as well, the latter portion being operatively engaged by a threaded and split portion 37 of sleeve 34, and the unthreaded portion having an easy turning fit with the interior of sleeve 34. At its opposite ends, shaft 35 is recessed and receives trunnions formed on the inner ends of screws 38 that are threaded through posts 13 and 14, lock nuts maintaining the screws in their adjusted positions.

Secured to shaft 35, as by being forced onto an end thereof having longitudinally disposed straight knurls, is a cylindrical knob 39, having a periphery that in one part is serrated by knurling for easy rotation, and which has annularly disposed graduations dividing the knob's periphery into one hundred divisions, later more particularly referred to. Rotating knob 39 causes the carriage comprising the shaft connected arms 33 and sleeve 34 to act as a traveling nut, since this carriage is held from rotation. Consequently, knob 39 can be rotated to move spherical roller 32 radially across the smooth side of the combination disk and gear 60. This results in a variable drive, since the speed of rotation of a cylindrical roller 40, which is maintained in contact with spherical roller 32 is dependent upon the position of the latter roller radially of gear-disk 60. Such a setting is made in accordance with a value determined by formula, as will be set forth. As this value may be in the form of a mixed number, a scale is provided which has major graduations reading 5—10—15 etc., to 30, and further has intervening unit graduations. This scale is arranged along a straight edge of frame plate 11. A pointer 42 carried by sleeve 34 extends toward the straight edge, being bent so that its free end is contiguous to the scale; and is attenuated for distinct reading. Pointer 42 is set to the whole number of the setting, while the decimal is set by bringing the decimal value given by the graduations on knob 39 opposite an index line 41 on plate 11. A single manipulation of knob 39 is sufficient for the complete setting necessary to properly position spherical roller 32.

Cylindrical roller 40 is of sufficient length to permit all the necessary settings of spherical roller 32. Roller 40 is also recessed at both ends, so that each end contains a raceway in which is located an annulus of balls 43. At the left in Fig. 2 the balls 43 are seen to encircle a stud 44 secured to the adjacent arm of a U shaped bracket 45. The corresponding arm on the right hand side of the bracket 45 has threaded through it a screw 46 similar to screws 38 in posts 13 and 14. Roller 40 is therefore adjustably mounted in anti-friction fashion.

Bracket 45 is pivotally mounted on screws 47, which are threaded through posts 15 and 16, and is provided substantially midway between its arms with a depending leg 48. With its extremities seated in cavities in posts 15 and 16, a spring rod 49 passes behind the opposite side of the bracket leg, thereby, through force developed by its flexure, causing the bracket arms to force cylindrical roller 40, spherical roller 32 and gear-disk 60 into non-slipping relation. Also, the arms 33, and, therefore sleeve 34 rigidly connected therewith are prevented from rotating when knob 39 is turned, the arms and sleeve thereby acting as a traveling nut, as previously stated.

Mounted on one end of cylindrical roller 40 is a gear 50, which may have twelve teeth, and which meshes with another gear 60ª which is like gear 60 and is furnished with sixty teeth. To be clearly seen in Fig. 4, gear 60ª has rigidly combined therewith a shaft or stud 51, having a bearing in plate 11. Passing through stud 51 to project equidistantly from opposite sides thereof is a driving pin 52. Mounted over stud 51 is a removable chart disk 53, the hub 54 of which is slid over stud 51, and is provided with a groove which fits over driving pin 52, whereby chart disk 53 is rotated in unison with gear 60ª.

Figure 5:
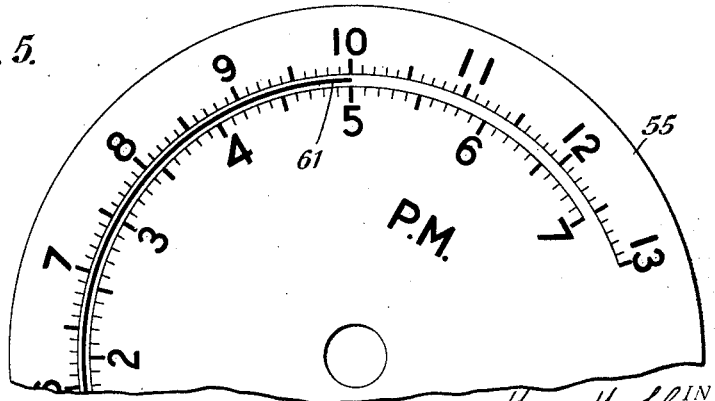
Figure 5 illustrates part of one form of a removable chart, showing a bonus-earning record thereon.

A chart 55 which may be like that shown in Figs. 1 and 5, or of different form, is laid against the outer face of chart disk 53.

Thereafter, a nut 56 is screwed onto the outer threaded end of stud 51. Nut 56 has a recess that is entered by the hub 54 of the chart disk so that the inner face of the nut 56 may bear against and hold in place chart 55.

The front of the meter forms a result-denoting indicator, showing a comparative measure of the work accomplished. An arm 57 is suitably secured in place, as to glass-retaining ring 8, and carries a pen 58 adapted to bear against the chart 55. This pen retains a supply of ink sufficient to last for not less than for the entire recording operation for which the chart is used. As gear 60ª revolves in unison with the chart it is held in anti-friction relation to plate 11 by tengential contact with spacing devices 59.

The operation of the production meter is as follows: Any suitable connection is made between the machine to which the instrument is applied, so that corresponding revolution of shaft 9 of the meter results from the operation of the machine. Through the variable speed drive previously described, rotation of chart disc 53 and chart 55 clamped thereto will follow, and a record will be made on the chart. There are, however, certain primary considerations, which involve setting the meter to the particular requirements of the case.

Referring to Fig. 1, the chart 55 is shown as having two annularly arranged sets of graduations, the outer graduations being adapted to co-act with the pointer on the arm 57, or with a pen-drawn line 61 shown in Fig. 5, to show the amount of work performed in terms of pay hours. The inner graduations disclose the amount of work which should be performed in hourly intervals, and a comparison of the reading given by the inner graduations and the pointer on arm 57 with a time-piece will show whether the workman is operating the machine below, at, or above what has been adopted as a standard for an hour's work or output. The outer graduations are effected by properly spaced numerals indicating successive pay hours. The inner graduations simulate and may be compared with those graduations of a time-piece which correspond to the hours of a working day, there being, however, the omission of one hour to offset the intermission for a lunch period. It is evident from the foregoing that the instrument in its illustrated form constitutes a pay time indicator, showing how much time the workman is entitled to be paid for.

Some machines to which the meter may be applied are more efficient and may be operated more continuously than others, and some workmen are more proficient, in varying degrees, than their fellow workmen. If for example, a certain machine is 100% efficient, and its operator is sufficiently skillful to run the machine so that it maintains its full efficiency, the numbered graduations on the outer and inner scales of chart 55 could lie on the same radial lines. Then when a time-piece showed that one hour had elapsed, the numeral 9 of the inner graduations would be at the pointer on arm 57 as would the numeral 1 of the outer graduation. This would show that a full hour's work had been done in one hour and that the workman had earned one hour's pay. At this rate the chart 55 would make 1 revolution in twelve hours.

But it is advantageous to provide the workman with an incentive to do more work in a given time, and if he succeeds in doing it, he is entitled to greater pay. Consequently, the outer graduations may be more closely spaced than the inner graduations, whereby, when the simulated hours of the inner graduations concur with actual hours, the time to be paid for will be indicated on the outer graduations as being more than an hour. That is, the workman will be paid a premium.

Various causes, such as more frequent set-ups in one machine than in another, and other incidental delays not chargeable to the workman determine the efficiency of the machine, and make it necessary to set the meter in accordance with the efficiency of the machine in question. This setting is determined by the following formula:

$$S = \frac{1500}{NE}$$

Where S = the desired setting
N = R. P. M. of driving shaft
E = efficiency of operation
1500 = constant for instrument and may vary with design.
Let S = setting
N = 105 R. P. M.
E = 78 per cent.
Constant = 1500, then $$S = \frac{1500}{105 \times \cdot 78} = \frac{1500}{81 \cdot 9} = 18 \cdot 31$$

To make the setting in the instrument, the cover 2 is opened as shown in Fig. 2, and the chart disk 53 is removed. The knob is rotated until pointer 42 is opposite 18 on the scale at the straight edge of plate 11. Continued rotation of knob 39 is necessary only until the decimal part of the setting reads in hundreds opposite index line 41.

The setting having been made, the meter placed in normal condition and the machine started up, chart 55 will be rotated with disk 53 in counter-clockwise direction. The extent of the counter-clockwise rotation of the chart 55 is dependent upon the amount of operation of the machine. On the basis of the machine working continuously at 100% efficiency, one revolution of the chart 55, in the instrument illustrated, will take place in twelve hours. But, when the efficiency of the machine is below 100%, as, for example, when it has the 78% efficiency of the problem last referred to above the chart 55 must rotate more rapidly when it is actuated to synchronize the simulated hours of its inner graduations with actual hours. The variable speed gearing is accordingly set by knob 39 to compensate for the difference between 100% efficiency and the lesser degree of efficiency the machine actually has.

In Fig. 1, the chart 55 is shown in a position corresponding to the beginning of a day's work at 8 a. m. If the operator of the machine is slow in getting under way, or does not operate his machine in accordance with the rate of efficiency at which it is expected to be run, the lessened number of revolutions given shaft 9 of the meter by the machine will show on the chart. For instance, if a time-piece shows that the hour from 8 a. m. to 9 a. m. has elapsed and there has been an under-operation of the machine, the chart 55 will have advanced for a distance less than that between the 8 a. m. and 9 a. m. graduations of the inner annular scale on the chart, and will show, say, that 7/10 of an hour's work has been accomplished in an hour. The operator thus sees that he must speed up.

If, however, he has caused the machine to perform a full hour's work, he will find that the numeral 9 of the inner graduations is at the pointer of arm 57, and that this pointer will also read one and a quarter hours on the outer graduations, which is the amount he will be paid for that hour, which amount includes his premium. Were his day to terminate at 5 o'clock, he would have worked eight hours, and by premium would be entitled to ten hours pay, the meter having acted as a pacemaker for him. This is shown on the chart partly illustrated in Fig. 5, where the pen line 61 terminates at 5 p. m. and also at 10 pay hours—the time for which he will receive pay. Should he fail to earn a premium, he will merely receive his daily wage.

When chart 55 is driven, it is caused to rotate at the rate of once in twelve hours when the allotted efficiency of the machine is 100%, and when the machine's rated efficiency is less, compensation is made, as previously explained, by an adjustment of the variable speed drive. This will be evident from the ensuing analysis of the effect of the setting of the instrument in accordance with the hereinbefore referred to formula, to which, for simplicity, assign the following values:

$S$ = Setting.
$N$ = 60 R. P. M.
$E$ = 100%
Constant = 1500

Then $S = \dfrac{1500}{60 \times 1.00} = 25$

Consequently, with the values hereinbefore assigned to the gears in the illustrated embodiment of the invention, it is clear that gear 30 will have a speed resulting from the division of the 60 R. P. M. of shaft 9 by its 30 teeth, or $$\dfrac{60}{30} = 2 \text{ R. P. M.}$$

The speed of gear 24 will be $$\dfrac{2}{24} = 1/12 \text{ R. P. M.},$$

and that of gear 60 will equal $1/12 \div 60 = 1/12 \times 1/60 = 1/720$ R. P. M. Since pointer 42 set at graduation 25 gives a gear ratio between disk-gear 60 and roller 40, through roller 32 of 5 to 1, the rotation of roller 40 will be at the rate of $1/720 \times 5 = 5/720$. Gear 50, however, is at a 1 to 5 ratio with chart-driving gear $60^a$, so that this gear and the chart-carrying disk 53 have 5/720 R. P. M. divided by $5 = 1/720$ R. P. M. This times 60 minutes gives $1/720 \times 60 = 60/720$ revolutions per hour, and $60/720 \times 12 = 720/720 = 1$ revolution per 12 hours, which is the rate of revolution of the chart for a twelve hour day under the values assigned to the formula.

From the foregoing, the operation of the production meter is made plain, it being obvious, of course, that various modifications can be indulged in to adapt it to its manifold uses without departing from the spirit of this invention.

We claim:—

1. In an instrument of the class described, a part adapted to be connected to a member whose rate of working is known; a variable speed mechanism connected to and maintained under the control of said part, said mechanism comprising driving and driven elements; means for adjusting the speed ratio between said driving and driven elements comprising a scale for adjusting said ratio in accordance with the rate of performance of the member and an efficiency factor, and pay time indicating means driven by said variable speed mechanism.

2. In an instrument of the class described, pay time indicating mechanism, a variable speed mechanism for driving said pay time indicating mechanism; means for adjusting the speed ratio of said variable speed mechanism and an efficiency factor scale associated with said adjusting means for indicating the ratio at which said variable speed mechanism is set.

3. In an instrument of the class described, a stationary marker, a revoluble chart having a pay time scale thereon co-operating with said marker, variable speed mechanism connected to said chart, means for driving said variable speed mechanism from an out-side source of power whose normal rate of operation is known, and means for indicating the adjustment of said variable speed mechanism.

4. In an instrument of the class described, a stationary marker, a revoluble pay time chart co-operating with said marker, a variable speed mechanism driving said chart, means for connecting said variable speed mechanism to a source of power whose maximum and average rates of operation are known, and a scale for adjusting said variable speed in accordance with said maximum and average rates of operation.

5. In an instrument of the class described, a driving shaft adapted to receive movement from a work performing means, reduction gearing driven thereby, variable speed changing means combined with said reduction gearing, a pay time indicator operable by said gearing, and an indicator operable to set said variable speed-changing means in accordance with the efficiency of the work-performing means.

6. In an instrument of the class described, a driving shaft mounted for relatively rapid rotation, a chart and a pointer therefor relatively movable to each other, a speed reducing drive from said shaft operable to move said chart and pointer with respect to each other, and variable speed-changing means adjustable to regulate said drive in accordance with a rate of rotation of said shaft.

7. In an instrument of the class described, a supporting frame, reduction gearing mounted therein, variable speed-changing means combined therewith comprising a disk and spherical and cylindrical rollers in mutual peripheral contact, the spherical roller being displaceable to vary the relative speeds of said disk and the cylindrical roller, and a chart and pointer relatively movable to each other by actuation of said gearing.

8. In an instrument of the class described, reduction gearing, variable speed-changing means combined therewith comprising a disk, a cylindrical roller, a spherical roller movable radially of said disk and longitudinally of said cylindrical roller and means movable longitudinally of the last mentioned roller adapted to retain said spherical roller in a selected position, and a pay time indicator operable by said gearing.

9. In an instrument of the class described, a pay time indicator, operating gearing therefor including a gear member displaceable radially of another gear member which drives it to vary the speed of said gearing, shifting means for said displaceable gear member comprising scales and indicating devices co-operative with said scales, whereby said displaceable member may be set in accordance with mathematical information.

10. In an instrument of the class described, a revoluble chart disk, driving gearing therefor including in part friction drive members, one of which is a cylinder, a pivoted frame in which said cylinder is mounted, and an anchored flexible rod engaging said pivoted frame thereby placing said cylinder and friction drive members under pressure.

11. In an instrument of the class described, a pay time indicator, operating gearing therefor including a gear member displaceable to vary the resultant speed of said gearing, and shifting means for said gear member comprising a shaft mounted in supports and provided with feeding means, a revolubly mounted shaft provided with feeding means co-acting with the feeding means of said first mentioned shaft, a carrier operable by said combined feeding means to shift said gear member, an operating knob and position-indicating means controllable by said knob.

12. In an instrument of the class described, a supporting frame, gearing mounted therein including a gear provided with a stud having projecting driving means permanently combined therewith, a removable chart disk having a hub normally penetrated by said stud, said hub being adapted to interlock with said driving means, and a clamping device adjustable to maintain the movable parts in relation for rotation in unison.

13. In an instrument of the class described, driving gearing including a gear provided with a stud having projecting driving means, a removable chart disk having a hub slidable on to said stud and into operative relation with said driving means, a separate chart, and a nut threaded on to said stud adapted to maintain the parts in relation for unified rotation.

14. In an instrument of the class described, a supporting frame having a pair of spaced plates, gears one adjacent to each plate and mounted in anti-friction relation thereto, toothed reduction gearing in mesh with the first mentioned gears, friction-drive gearing driven by one of said first mentioned gears to transmit motion to the other thereof, and a chart driven with the last mentioned gear, said friction drive gearing being adjustable to establish a variable resultant drive.

15. In an instrument of the class described, a driving shaft responsive to movement of a work-performing device having a given efficiency, a chart, an indicator co-acting therewith, a variable speed drive operable from said shaft to effect relative movement between said chart and indicator, said chart bearing scales the relation thereto of said indicator serving to give a measure of work accomplished in any elapsed time interval in comparison with the amount that should have been performed, and means for setting said variable speed drive to adjust the relative movement between said chart and indicator to the efficiency of the work-performing device.

16. In an instrument of the class described, a driving shaft responsive to movement of a work-performing device having a given efficiency, a chart, an indicator coacting therewith, a variable speed drive operable from said shaft to effect relative movement betwen said chart and indicator, said chart bearing scales the relation thereto of said indicator serving to give a measure of work accomplished in any elapsed time interval in comparison with the amount that should have been performed.

HENRY MOAKLEY.
ELLIOTT P. ROSS.